Aug. 10, 1943.     G. EGLOFF ET AL     2,326,627
TREATMENT OF HYDROCARBON OILS
Filed Sept. 30, 1940
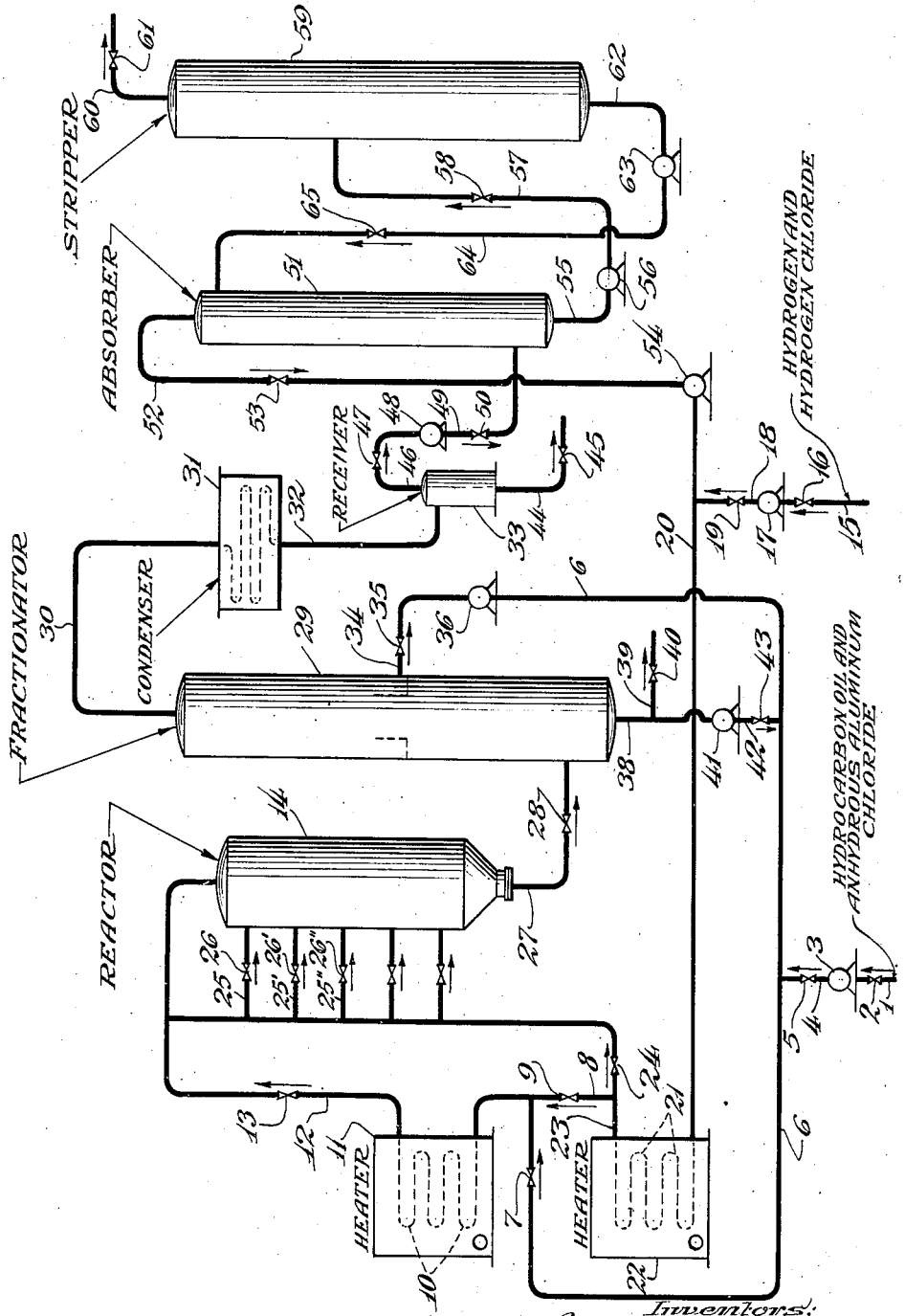

Patented Aug. 10, 1943

2,326,627

UNITED STATES PATENT OFFICE 2,326,627

TREATMENT OF HYDROCARBON OILS

Gustav Egloff and Vasili Komarewsky, Chicago, Ill., assignors to Universal Oil Products Company, Chicago, Ill., a corporation of Delaware Application September 30, 1940, Serial No. 359,074

5 Claims. (Cl. 196—54)

This invention relates to the treatment of hydrocarbon oils with hydrogen in the presence of aluminum chloride and hydrogen chloride to produce therefrom substantial yields of isobutane and a substantially saturated motor fuel with a high content of isoparaffins.

The process is particularly applicable to the treatment of gas oil distillates obtained as intermediates in the distillation of crude oils but may also be applied to the treatment of other high boiling petroleum fractions. More particularly the process of this invention is concerned with the catalytic conversion of petroleum fractions boiling higher than gasoline by a continuous hydrogenation treatment in the presence of anhydrous aluminum chloride and hydrogen chloride to form high yields of isobutane, isopentane, and higher boiling isoparaffins.

Isobutane has become a material of great importance to the oil industry as the result of processes of comparatively recent development which are effective in converting it to isoparaffins boiling within the range of gasoline and which are greatly in demand as fuels for airplane engines. The isobutane may be catalytically or thermally dehydrogenated to form isobutene which may be then polymerized to form branch chain octenes which readily hydrogenate to the corresponding isooctanes. Isobutane may be alkylated with olefins either by thermal or catalytic processes to form isoparaffins boiling within the range of gasoline. Isobutene formed by the dehydrogenation of isobutane may also be used as a constituent in the manufacture of rubber-like products.

When mixtures of hydrocarbon oils and anhydrous aluminum chloride are heated under cracking conditions, the olefinic constituents produced form complexes with the catalyst which destroy its activity, resulting in excessive consumption of catalyst. One feature of our process consists in cracking in the presence of hydrogen to prevent the formation of olefins and thus increase the life of the catalyst. Another feature of our invention is the use of anhydrous hydrogen chloride. This material exerts a pronounced catalytic effect, although the mechanism of this action is not known. It has been shown by experiment that when operating at a given set of conditions, such as temperature, contact time, and proportion of aluminum chloride to oil, that the use of the hydrogen chloride may increase the formation of gasoline boiling hydrocarbons as much as 50%. In the operation of our process, the charging stock, which may comprise a gas oil, is commingled with a recycle fraction and this combined feed together with anhydrous aluminum chloride, hydrogen chloride, and hydrogen is introduced to a heating coil and heated to a temperature within the approximate range of 300–700° F. The heated hydrocarbons are introduced to a reaction chamber in which further quantities of hydrogen and hydrogen chloride are introduced, preferably at several points in the chamber.

Hydrogen and hydrogen chloride are heated separately in a coil to a temperature within the approximate limits of 700–1000° F. and thus serve the additional function of providing heat for the reaction.

In one specific embodiment our invention comprises a process for the production of isobutane and high octane motor fuel which comprises charging hydrocarbon oil together with anhydrous aluminum chloride, hydrogen, and hydrogen chloride to a heating coil, heating said oil to a temperature adequate to cause destructive hydrogenation of said oil, simultaneously heating a mixture of hydrogen and hydrogen chloride in a separate heating coil, supplying the mixture of heated oil, anhydrous aluminum chloride, hydrogen chloride, and hydrogen to an adiabatic reaction chamber, supplying further quantities of hydrogen and hydrogen chloride at various points within the reaction chamber and fractionating the conversion products from said reaction chamber to separate isobutane and a motor fuel.

The accompanying drawing diagrammatically illustrates an arrangement of apparatus embodying a process flow of our invention and other features hereinafter set forth.

Referring now to the drawing, charging stock for the process, which may comprise a gas oil or in general any hydrocarbon oil boiling above the range of gasoline, is supplied to the system through line 1, valve 2 from which it enters pump 3 discharging into line 4 controlled by valve 5. This charging stock and aluminum chloride is then commingled in line 6 with recycle streams formed as hereinafter described. This combined feed passes through valve 7 and is discharged into line 8 wherein its is commingled with heated hydrogen and hydrogen chloride and then introduced to heating coil 10 so disposed as to receive heat from furnace 11. Heating coil 10 is operated under a pressure varying within the approximate limits of 100–2000 pounds per square inch with a discharge temperature varying within the approximate limits of 400–700° F. It discharges into line 12 controlled by valve 13 and is then supplied to reactor 14.

Simultaneously hydrogen and hydrogen chloride are introduced to the system by way of line 15 controlled by valve 16 supplying pump 17 which discharges into line 18 controlled by valve 19. The mixture of hydrogen and hydrogen chloride is then supplied to line 20 wherein it is commingled with a recycle fraction of hydrogen and hydrogen chloride. The combined streams of hydrogen and hydrogen chloride are then supplied to heating coil 21 so disposed as to receive heat from furnace 22. The mixture of hydrogen and hydrogen chloride leaves heating coil 21 by way of line 23 controlled by valve 24 and at a temperature within the approximate limits of 600–1000° F. and a pressure within the approximate limits of 100–2000 pounds per square inch. A portion of this heated hydrogen and hydrogen chloride is introduced to line 12 and commingled with the combined hydrocarbon feed and the remainder is introduced to reactor 14 at a plurality of points by way of lines 25 controlled by valve 26, lines 25' controlled by valve 26', etc. Reactor 14 operates without a liquid level and at a pressure somewhat below that of the heating coils, usually within the approximate limits of 50–800 pounds per square inch.

The proportions of hydrogen chloride and hydrogen in the stream entering heating coil 21 usually lie within the ratios of 5 mols of hydrogen chloride to 95 of hydrogen and 25 mols of hydrogen chloride to 75 mols of hydrogen. It has been found by experiment that when less than 5 mols of hydrogen chloride and 95 mols of hydrogen are used that the rate of reaction is appreciably lessened requiring either a higher temperature in the reaction chamber or a greater time of contact or a proper combination of these factors. The quantity of aluminum chloride used in the feed to line 1 varies from about ¼ to ¾% by weight of the charging stock. The mixture of vapors and liquid with suspended aluminum chloride leaves reactor 14 by way of line 27 controlled by valve 28 and is discharged into fractionating column 29. In the operation of fractionating column 29 an overhead fraction comprising gasoline and normally gaseous products is removed by way of line 30 and cooled by condenser and cooling coil 31. The mixture of liquid with uncondensed and undissolved vapors leaves cooling coil 31 by way of line 32 and is supplied to receiver and separator 33.

A higher boiling liquid fraction is removed from fractionating column 29 by way of line 34 controlled by valve 35, after which it enters pump 36 discharging into line 6 for recycling to heating coil 21 as indicated in the diagram. The non-volatile liquid residue collected in the bottom of fractionating column 29 is removed by way of line 38 and a portion removed from the system by way of line 39 controlled by valve 40. The remainder and greater portion of this non-vaporous liquid residue is supplied to pump 41 discharging into line 42 controlled by valve 43. After passing through valve 43 this non-vaporous liquid fraction is commingled with the intermediate boiling fraction in line 6 and with the feed for the process supplied by way of line 4.

The liquid fraction collecting in receiver 33 is removed by way of line 44 controlled by valve 45 and constitutes a product of the process. The gaseous fraction collecting in receiver 33 is removed by way of line 46 controlled by valve 47 and enters pump 48 which discharges into line 49 controlled by valve 50. From line 49 this gaseous fraction is supplied to absorber 51 wherein it comes in contact with the hydrocarbon absorption oil, as for example, a naphtha fraction, the hydrocarbon constitutents in said gaseous fraction being dissolved in the absorption oil. The hydrogen and hydrogen chloride remain substantially undissolved and are removed from absorption column 51 by way of line 52 and after passing through valve 53 enter compressor 54 which discharges into line 20. This recycle fraction comprising hydrogen and hydrogen chloride is then commingled with extraneous hydrogen and hydrogen chloride supplied to the system by way of line 15, valve 16 from which it enters compressor 17 discharging into line 18 controlled by valve 19, after which the recycle stream is commingled with a fresh supply of hydrogen and hydrogen chloride.

The rich absorption oil is removed from column 51 by way of line 55 from which it enters pump 56 discharging into line 57 controlled by valve 58. After passing through valve 58 this rich absorption oil enters stripper 59 in which the gaseous paraffinic constitutents are removed by distillation. This gaseous fraction is removed from stripper 59 by way of line 60 controlled by valve 61 and includes paraffins from methane to butane inclusive and is very rich in isobutane. The isobutane may be removed from this fraction by distillation methods well known to that art. It constitutes a product of the process and may be alkylated by olefins to form liquid isoparaffins or may be dehydrogenated to form isobutylene. This isobutylene may be used in the preparation of rubber-like products or may be polymerized and the polymer hydrogenated to form iso-octanes. The lean absorption oil is removed from the bottom of column 59 by way of line 62 and then enters pump 63 discharging into line 64 controlled by valve 65. After passing through valve 65 this lean absorption oil is supplied to absorption column 51 for re-use.

The following example illustrates the yield of the principal products obtainable in the normal operation of the process. While the data are characteristic, they are not introduced with the intent of unduly limiting the proper scope of the invention. A Pennsylvania gas oil of 36.9 A. P. I. gravity and the following Engler distillation will be used in this illustration.

| | °F. |
|---|---|
| Initial boiling point | 440 |
| 5% | 480 |
| 10% | 507 |
| 20% | 550 |
| 30% | 589 |
| 50% | 635 |
| 70% | 668 |
| 90% | 726 |
| End point | 760 |
| Per cent over | 98.1 |
| Bottoms plus coke | 1.0 |

A yield of 64% of 400° end point gasoline of a 79 octane number by the C. F. R. motor method and a quantity of liquid butane equivalent to 12% by volume of the charge may be obtained by operating under the following set of conditions. The quantity of aluminum chloride used will be about ½% by weight of the charging stock, the combined feed entering the primary heating coil containing about 5 pounds of anhydrous aluminum chloride per 100 pounds of oil. The temperature and pressure of the mixture leaving this primary heating coil may be about 650° F. and 400 pounds per square inch. The mixture of hydrogen and hydrogen chloride leaving the secondary heating coil will contain about 6 mols of hydrogen per mol of hydrogen chloride and will be at a temperature of 950° F. and a pressure of about 1000 pounds per square inch. The adiabatic reactor may be operated at a pressure of about 500 pounds per square inch.

We claim as our invention:

1. A process for the conversion of hydrocarbon oil into more valuable products which comprises mixing said oil with aluminum chloride to form a slurry, heating said slurry to a conversion temperature, introducing the heated slurry to one end of a reaction zone and therein effecting conversion of said oil in the absence of any external application of heat, withdrawing conversion products from the opposite end of said zone at a rate such that no substantial accumulation of liquid takes place therein, simultaneously in a second heating step heating a mixture of hydrogen and hydrogen chloride to a temperature above said conversion temperature, and supplying the thus heated mixture to said reaction zone to supply heat and promote the desired reaction.

2. A process for the conversion of hydrocarbon oil into more valuable products which comprises mixing said oil with aluminum chloride to form a slurry, heating said slurry to a conversion temperature, introducing the heated slurry to one end of a reaction zone and therein effecting conversion of said oil in the absence of any external application of heat, withdrawing conversion products from the opposite end of said zone at a rate such that no substantial accumulation of liquid takes place therein, simultaneously in a second heating step heating a mixture of hydrogen and hydrogen chloride to a temperature above said conversion temperature, and supplying the thus heated mixture to said reaction zone to supply heat and promote the desired reaction, separating an aluminum chloride sludge from the resulting vaporous conversion products, fractionating the latter to form reflux condensate and to separate fractionated vapors, supplying said reflux condensate to the first mentioned heating step, and finally condensing the fractionated vapors.

3. The process of claim 1 further characterized in that the heated mixture is introduced at spaced points in said reaction zone.

4. The process of claim 2 further characterized in that at least a portion of said aluminum chloride sludge is returned to the conversion step.

5. The process of claim 2 further characterized in that hydrogen and hydrogen chloride are separated from said fractionated vapors and returned to the second mentioned heating step for reuse.

GUSTAV EGLOFF.
VASILI KOMAREWSKY.